US012631551B2

(12) United States Patent
Scholz et al.

(10) Patent No.: US 12,631,551 B2
(45) Date of Patent: May 19, 2026

(54) DEVICE ASSEMBLY AND METHOD FOR CALIBRATING A SINGLE-USE SENSOR

(71) Applicant: Sartorius Stedim Biotech GmbH, Goettingen (DE)

(72) Inventors: Jochen Scholz, Goettingen (DE); Christian Grimm, Goettingen (DE)

(73) Assignee: SARTORIUS STEDIM BIOTECH GMBH (DE)

( * ) Notice: Subject to any disclaimer, the term of this patent is extended or adjusted under 35 U.S.C. 154(b) by 57 days.

(21) Appl. No.: 18/854,183

(22) PCT Filed: Apr. 5, 2023

(86) PCT No.: PCT/EP2023/058977
§ 371 (c)(1),
(2) Date: Oct. 4, 2024

(87) PCT Pub. No.: WO2023/194457
PCT Pub. Date: Oct. 12, 2023

(65) Prior Publication Data
US 2025/0341461 A1     Nov. 6, 2025

(30) Foreign Application Priority Data

Apr. 6, 2022    (EP) .................................... 22167033

(51) Int. Cl.
*G01N 21/31*          (2006.01)
*G01N 1/14*           (2006.01)
(52) U.S. Cl.
CPC .............. *G01N 21/31* (2013.01); *G01N 1/14* (2013.01); *G01N 2201/127* (2013.01)

(58) Field of Classification Search
CPC .... G01N 21/31; G01N 1/14; G01N 2201/127; C12M 23/28; C12M 41/00; C12M 29/00; C12M 37/02
(Continued)

(56) References Cited

U.S. PATENT DOCUMENTS

| 2010/0015696 A1* | 1/2010 | Claes | .................... B01F 33/813 |
| | | | 435/303.3 |
| 2011/0198241 A1 | 8/2011 | Murakami | |

(Continued)

FOREIGN PATENT DOCUMENTS

| EP | 2689237 A1 | 1/2014 |
| WO | 2007/129463 A2 | 11/2007 |

(Continued)

*Primary Examiner* — Md M Rahman
(74) *Attorney, Agent, or Firm* — Dilworth IP, LLC

(57)          ABSTRACT

A device assembly for calibrating a single-use sensor before, during or after a biopharmaceutical manufacturing process step including a single-use process equipment assembly for performing at least a part of the process step. The single-use process equipment assembly includes a flow line through which a medium flows in a defined direction during the process step and an integrated single-use sensor for measuring or detecting a property at a measurement location in the flow line. The device assembly includes a calibration line and a switch inserted into the flow line upstream of the measurement location. The switch includes a flow line inlet, a flow line outlet, and a calibration line inlet connected to the calibration line. The switch selectively switches between a first (main) flow path and a second (calibration) flow path. The device assembly includes a dedicated reference sensor, reference source, or reference standard solution in the calibration line.

15 Claims, 5 Drawing Sheets

(58) Field of Classification Search
USPC ......................................................... 356/326
See application file for complete search history.

(56)                     References Cited

U.S. PATENT DOCUMENTS

| | | |
|---|---|---|
| 2012/0272709 A1 | 11/2012 | Murakami |
| 2016/0298988 A1 | 10/2016 | Hahn et al. |

FOREIGN PATENT DOCUMENTS

| | | |
|---|---|---|
| WO | 2012/134820 A1 | 10/2012 |
| WO | 2020/079101 A1 | 4/2020 |

* cited by examiner

DEVICE ASSEMBLY AND METHOD FOR CALIBRATING A SINGLE-USE SENSOR

FIELD OF THE INVENTION

The invention relates to a device assembly and a method for calibrating a single-use sensor before, during or after a biopharmaceutical manufacturing process step.

BACKGROUND

There is a clear trend in the biopharmaceutical industry to use more single-use equipment in clinical trial manufacturing or even commercial manufacturing, both following so-called "current good manufacturing practices" regulations (cGMP). Most often such processes require different control loops for especially critical process parameters (CPP) in order to keep process and product quality within defined limits. For such control loops the usage of single-use sensors as measuring devices is necessary. A great variety of such sensors are known for different physical or chemical properties such as pH, dissolved oxygen (DO), conductivity, pressure, flow, temperature, turbidity, viscosity etc.

Application of a sensor in a cGMP environment for CCPs requires integrity and reliability of the sensor and its measurement value output over the whole process or batch duration to ensure the quality level over the full production time or production lot, respectively. For this purpose, a standard way on assessing the measurement capability of an individual sensor component is the pre-use and post-use calibration of a sensor in order to guarantee that the sensor as such was capable to measure within a certain accuracy range over the complete duration of its use. In case of a reusable sensor, e.g. in a stainless-steel flow line assembly, this is relatively straight-forward. The sensor is calibrated outside the flow line or in a specific bypass arrangement. After calibration, the flow line is sanitized/sterilized including the assembled sensor. The process is then run, knowing that the sensor was working in specification at the beginning of the process. After finalizing the process, e.g. the batch, the flow line is again sanitized/and deactivated by use of caustics such as 3-molar sodium hydroxide (NaOH) and rinsed with water for injection (WFI) afterwards. After that step, the sensor can be disassembled and calibrated again in comparison to a reference sensor or with a certified standard.

In a single-use environment and in case of the need or demand for a fully closed process, this workflow does not apply anymore. Especially the disassembly of the sensor from the single-use tube line assembly contradicts a closed system or in general a disposable approach.

WO 2020/079101 A1 shows a bioprocessing fluid sensor with a sensor arranged in a process fluid path. A bypass fluid path is provided for bypassing the sensor. A conditioning or cleaning fluid inlet line enters into the process fluid path upstream of the sensor, and a conditioning or cleaning fluid outlet line exits from the process fluid path downstream of the sensor. Flow controls control the fluid to flow either in the process fluid path through the sensor, or in the bypass fluid path omitting the sensor, or through the conditioning or cleaning fluid lines including the sensor but completely omitting the remaining process fluid path and the bypass fluid path.

SUMMARY

It is an object of the invention to enable a proper calibration workflow for a single-use sensor which is integrated in a single-use process configuration.

The above problem is solved by a device assembly according to claims 1 and 4. Advantageous and expedient embodiments of the invention are apparent from the dependent claims.

According to a first aspect, the invention provides a device assembly for calibrating a single-use sensor before, during or after a biopharmaceutical manufacturing process step. The device assembly comprises a single-use process equipment assembly for performing at least a part of the process step. The single-use process equipment assembly includes a flow line through which a medium flows in a defined direction during the process step. The single-use process equipment assembly further includes an integrated single-use sensor for measuring or detecting a physical or chemical property at a measurement location in the flow line. The device assembly according to the invention further comprises at least one calibration line and at least one switching means inserted into the flow line upstream of the measurement location. The switching means include a flow line inlet, a flow line outlet and a calibration line inlet connected to the calibration line. The switching means are adapted to selectively switch between a first (main) flow path, in which the flow line inlet and the flow line outlet are opened while the calibration line inlet is closed, and a second (calibration) flow path, in which the flow line inlet is closed while the calibration line inlet and the flow line outlet are opened. The device assembly according to the invention comprises a dedicated reference means provided in the calibration line. The dedicated reference means includes a reference sensor or a reference source or a reference standard solution related to the physical or chemical property to be measured or detected by the single-use sensor.

According to the first aspect, at least one calibration line (inlet line) is selectively connected to the flow line upstream of the single-use sensor to be calibrated. In the alternative, or in addition, at least one calibration line (outlet line) can be selectively connected to the flow line downstream of the single-use sensor to be calibrated.

According to this second aspect, the invention provides a device assembly for calibrating a single-use sensor before, during or after a biopharmaceutical manufacturing process step. The device assembly comprises a single-use process equipment assembly for performing at least a part of the process step. The single-use process equipment assembly includes a flow line through which a medium flows in a defined direction during the process step. The single-use process equipment assembly further includes an integrated single-use sensor for measuring or detecting a physical or chemical property at a measurement location in the flow line. The device assembly according to the invention further comprises at least one calibration line and at least one switching means inserted into the flow line downstream of the measurement location. The switching means include a flow line inlet, a flow line outlet and a calibration line outlet connected to the calibration line. The switching means are adapted to selectively switch between a first (main) flow path, in which the flow line inlet and the flow line outlet are opened while the calibration line outlet is closed, and a second (calibration) flow path, in which the flow line inlet and the calibration line outlet are opened while the flow line outlet is closed. The device assembly comprises a dedicated reference means provided in the calibration line. The dedicated reference means includes a reference sensor or a reference source or a reference standard solution related to the physical or chemical property to be measured or detected by the single-use sensor.

The invention is generally based on the finding that the addition of at least one special calibration line, including suitable means for calibration, to the process equipment assembly allows that the integrated single-use process sensor can remain in the flow line of the single-use process equipment assembly that is used for performing the biopharmaceutical process (step). This means that the calibration of the single-use sensor can be performed before, during or after a biopharmaceutical manufacturing process step without the need of detaching the single-use sensor from the single-use process equipment assembly. Thus, the single-use sensor can also be disposed together with the single-use process equipment assembly.

In the following, the scope of several terms used in connection with the invention will be explained:

With respect to the term "single-use", it should be noted that the skilled person can precisely distinguish between dedicated single-use components (disposables) on the one hand, which are not intended for cleaning after their one-time use but for disposal, and reusable components, which are intended for repeated use, on the other hand. In each case, it can be clearly determined whether a component of a device assembly is disposable or reusable based on its material and design. The components are clearly distinguished from one another in the specialist circles with regard to their intended use (single-use vs. reusable), and the respective advantages and disadvantages are distinct. Laboratory equipment suppliers specifically offer and market single-use disposable components with clear labeling.

Depending on the measurement technique, the single-use sensor to be calibrated is either integrated into a main line of the single-use process equipment assembly (inline measurement) or into a bypass line (online measurement). Accordingly, the term "flow line" can refer to a main line or to a bypass line. "Integrated" means that the sensor is or includes a component that is permanently fixed to the single-use process equipment assembly, especially to the flow line.

The single-use sensor to be calibrated can be any type of sensor for detecting or measuring one or more physical or chemical properties such as pH, dissolved oxygen (DO), conductivity, pressure, flow, temperature, turbidity, viscosity etc. The sensor can also be an analyzer. In connection with the present invention, the term "single-use sensor" especially refers to the portion, part or component of the sensor that comes into contact with the medium flowing through the flow line. For example, in case of a spectrometer, the medium passes through a detection chamber while the other parts of the spectrometer do not come into contact with the medium. In such a case, only the portion, part or component of the sensor that comes into contact with the medium needs to be configured for single-use.

The switching means can be any device or arrangement adapted to selectively switch between different flow paths. In the device assembly according to the invention, the switching means is adapted to switch, at least, between a "regular" first flow path, which corresponds to the regular flow of the medium during the biopharmaceutical process step, and a different second flow path, which is used especially for the calibration of the single-use sensor. The switching means can be a 3/2-way valve or a combination of (pinch) valves, for example.

The dedicated reference means is arranged in the additional calibration line and is especially provided for the purpose of calibrating the single-use sensor. According to the invention, this dedicated reference means can include a reference sensor (either single-use or reusable) which is preferably of the same type as the single-use sensor to be calibrated. The dedicated reference means can also include a reference source, e.g. a pressure source or pressure generator for applying a reference pressure. Furthermore, the dedicated reference means can include a reference standard solution with at least one exactly known property (pH, dissolved oxygen (DO), conductivity, turbidity, viscosity etc.).

The terms "upstream" and "downstream" refer to positions at the flow line with respect to the regular flow direction of the medium during the biopharmaceutical process step. For example, "upstream of the single-use sensor" refers to a location at the flow line where the medium has not yet passed the single-use sensor.

In a setup in which a calibration line connects to the flow line upstream of the single-use sensor, the corresponding the switching means can be arranged upstream of a main pump of the process equipment assembly. In this case the main pump can be used for two purposes: On the one hand, according to its conventional intended use, the main pump moves the medium through the flow line in order to perform the biopharmaceutical step. On the other hand, the main pump can also be used for supplying fluids from the calibration line to the flow line section where the single-use sensor to be calibrated is located.

However, an additional calibration pump can be arranged in the calibration line if the main pump cannot or shall not be used for taking in a fluid from the calibration line.

In a setup in which a calibration line connects to the flow line downstream of the single-use sensor, the fluid that was used for the calibration can either be directed into a waste container, or it can be released into the ambient air. In the first case the calibration line leads to a waste container, in the second case the calibration line has an open end.

An optional sterile filter can be arranged in the calibration line.

According to a special aspect of the invention, the dedicated reference means is traceable to a standard or a calibration according to a national or regional organization for standardization like the National Institute of Standards and Technology (NIST) in the US or the "Deutsches Institut für Normung" (DIN) in Germany. With such a reference means the accuracy of the calibration can be ensured.

For some calibration use cases it is necessary or expedient to have at least two separate calibration lines, one upstream of the single-use sensor and one downstream of the single-use sensor. The upstream calibration line is connected to the calibration line inlet of an upstream switching means inserted into the flow line upstream of the measurement location, and the downstream calibration line is connected to the calibration line outlet of a downstream switching means inserted into the flow line downstream of the measurement location.

It is a key aspect of the invention to calibrate a single-use sensor that is already or still fixed to the flow line of the process equipment assembly. This means that the fluids that are needed for the calibration procedure, including flushing and/or cleaning steps, should be supplied to the flow line of the process equipment assembly in an effective way, preferably directly via the calibration line that is connected to the flow line upstream of the single-use sensor. This can be achieved in that the calibration line is connected to at least one reservoir or feed line of the following: the reference standard solution; a sanitizing solution; a sterilization solution; a flushing fluid.

In this context, it is advantageous to provide a selection means that is adapted to connect only one reservoir or feed line to the calibration line at a time.

In order to enable an automated calibration procedure, the switching means for connecting and disconnecting the calibration line(s) are operated automatically by a control unit.

The invention also provides a method of for calibrating a single-use sensor before, during or after a biopharmaceutical manufacturing process step. The method is performed with a device assembly according to the invention and comprises the steps of: operating the switching means such that a calibration flow path is established, in which the flow line inlet is closed while the calibration line inlet and the flow line outlet are opened; measuring a physical or chemical property by the single-use sensor; and using the measurement and the reference means to calibrate the single-use sensor.

BRIEF DESCRIPTION OF THE DRAWINGS

Further features and advantages of the invention will become apparent from the following description and from the accompanying drawings to which reference is made. In the drawings.

DETAILED DESCRIPTION

Figure 1:
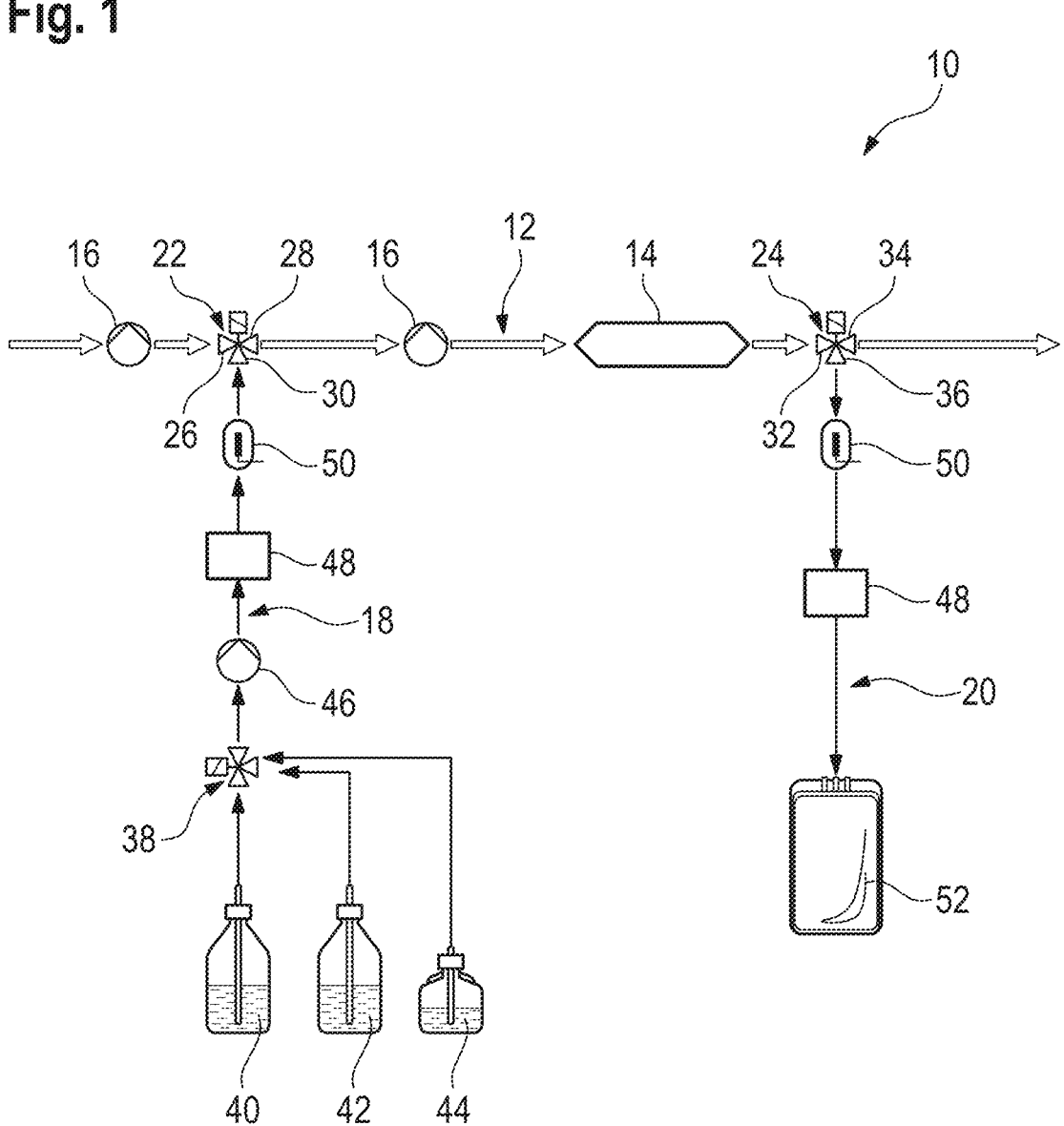
FIG. 1 shows a device assembly with components that can be used for calibrating a single-use sensor according to the invention.

In FIG. 1 a basic setup of a device assembly 10 is shown. The device assembly 10 comprises a single-use process equipment assembly for performing at least a part of a biopharmaceutical process step (especially a unit operation), including a main flow line 12 through which a medium flows in a defined direction during the process step as indicated by the arrows.

The single-use process equipment assembly further includes a single-use sensor 14 for measuring or detecting a physical or chemical property which is relevant for monitoring and/or controlling the process step. The single-use sensor 14 is integrated into the flow line 12 so that at least a portion, part or component of the sensor 14 that comes into contact with the medium is permanently attached to or inserted into the flow line 12 at a certain measurement location. For the sake of convenience, this location will be referred to as the location of the single-use sensor 14.

The single-use process equipment assembly also includes a main pump 16 for moving the medium through the flow line 12.

Other components of the process equipment assembly are not relevant here and therefore not shown.

However, FIG. 1 shows further components of the device assembly 10 for calibrating the single-use sensor 14. These components, all of which will be explained further below, can be used in a special calibration procedure that can be conducted before, during or after performing the biopharmaceutical process step. In any case, the calibration procedure is conducted while the single-use sensor 14 is integrated into the single-use process equipment assembly.

It is to be noted that not all of the calibration components shown in FIG. 1 are necessary for calibrating the single-use sensor 14. In particular, various selections of these components can be used, depending on the actual use case and the corresponding calibration technique, as will be described further below in connection with the other Figures.

According to FIG. 1, two calibration lines 18, 20 are selectively connected to the flow line 12 via switching means 22 and 24, respectively. The first switching means 22 is integrated into the flow line 12 upstream of the single-use sensor 14 and includes a flow line inlet 26, a flow line outlet 28 and a calibration line inlet 30. At least the flow line inlet 26 and the calibration line inlet 30 can be either opened or closed. The second switching means 24 is integrated into the flow line 12 downstream of the single-use sensor 14 and includes a flow line inlet 32, a flow line outlet 34 and a calibration line outlet 36. At least the flow line outlet 34 and the calibration line outlet 36 can be either opened or closed.

With respect to the first calibration line 18, the first switching means 22 can be operated to switch between a regular flow path, in which the flow line inlet 26 and the flow line outlet 28 are opened while the calibration line inlet 30 is closed, and a calibration flow path, in which the flow line inlet 26 is closed while the calibration line inlet 30 and the flow line outlet 28 are opened. With respect to the second calibration line 20, the second switching means 24 can be operated to switch between a regular flow path, in which the flow line inlet 32 and the flow line outlet 34 are opened while the calibration line outlet 36 is closed, and a calibration flow path, in which the flow line inlet 32 and the calibration line outlet 36 are opened while the flow line outlet 34 is closed.

The first calibration line 18 can be used to supply one or more fluids to the flow line 12 upstream of the single-use sensor 14. The fluid can be a cleaning fluid like water for injection (WFI), a sterilization or sanitizing fluid, or a reference standard solution.

The reference standard solution, which can be a process buffer for the process step or a caustic, has at least one exactly known property (pH, dissolved oxygen (DO), conductivity, turbidity, viscosity etc.) which is, or is closely related to, the physical or chemical property to be measured or detected by the single-use sensor 14. In particular, the reference standard solution is traceable to a standard or a calibration according to a national or regional organization for standardization, like the "National Institute of Standards and Technology" (NIST) in the US.

Depending on the use cases, other types of fluid may be supplied to the flow line 12 via the first calibration line 18. FIG. 1 shows a convenient setup with a selection means 38, such as a valve, for selectively connecting reservoirs of a reference standard solution 40, a sterilization or sanitation fluid 42 and water for injection (WFI) 44 to the first calibration line 18.

A calibration pump 46 is used to move the respective fluid to the calibration line inlet 26 of the first switching means 22. However, in case the main pump 16 is arranged downstream of the first switching means 22 (right-hand side in FIG. 1), a calibration pump 46 is not necessarily needed since the main pump 16 can be used to supply the fluid to the flow line 12 when the flow line inlet 26 of the first switching means 22 is closed and the calibration line inlet 30 and flow line outlet 28 are open.

If the single-use sensor 14 is a pressure sensor, or if for another reason a defined pressure is required to calibrate the single-use sensor 14, the calibration pump 46 (or the main pump 16 in case there is no calibration pump) needs to be calibrated to provide a defined reference pressure. To this end, also a calibrated pressure source (generator) can be used instead of a calibration pump.

In many use cases the single-use sensor 14 is calibrated with the aid of an already calibrated reference sensor 48 (single-use or reusable) which is arranged in the first calibration line 18. As explained above in connection with the reference standard solution 40, the reference sensor 48 can be a sensor which is traceable to a standard or a calibration according to a national or regional organization for standardization like the National Institute of Standards and Technology (NIST) in the US or the "Deutsches Institut für Normung" (DIN) in Germany.

With a sterile filter 50 arranged at the calibration line inlet 26 of the first switching means 22 it can be further ensured that no contaminations enter the flow line 12 via the first calibration line 18.

The second calibration line 20 can be used to withdraw fluid from the flow line 12 downstream of the single-use sensor 14.

A sterile filter 50 can be arranged in the second calibration line 20 outlet of the second switching means 24 to ensure that no contaminations exit if the second calibration line 20 has an open end.

A calibrated reference sensor 48 (reusable or single-use) is arranged in the second calibration line 20. As explained before, the reference sensor 48 can be a sensor which is traceable to a standard or a calibration according to a national or regional organization for standardization.

The second calibration line 20 ends in a waste container 52, or it has an open end.

As will be explained in the following example use cases, the reference sensor 48 or the pressure source (or another reference source) or the reference standard solution 40, or a combination of these components, is used as a dedicated reference means for the calibration of the single-use sensor 14.

The switching means 22, 24 can either be configured to be operated manually or configured to be operated automatically, e.g. with an electrical or pneumatic drive. Automatically operated switching means 22, 24 allow for automated workflows controlled by a control unit.

Figure 2:
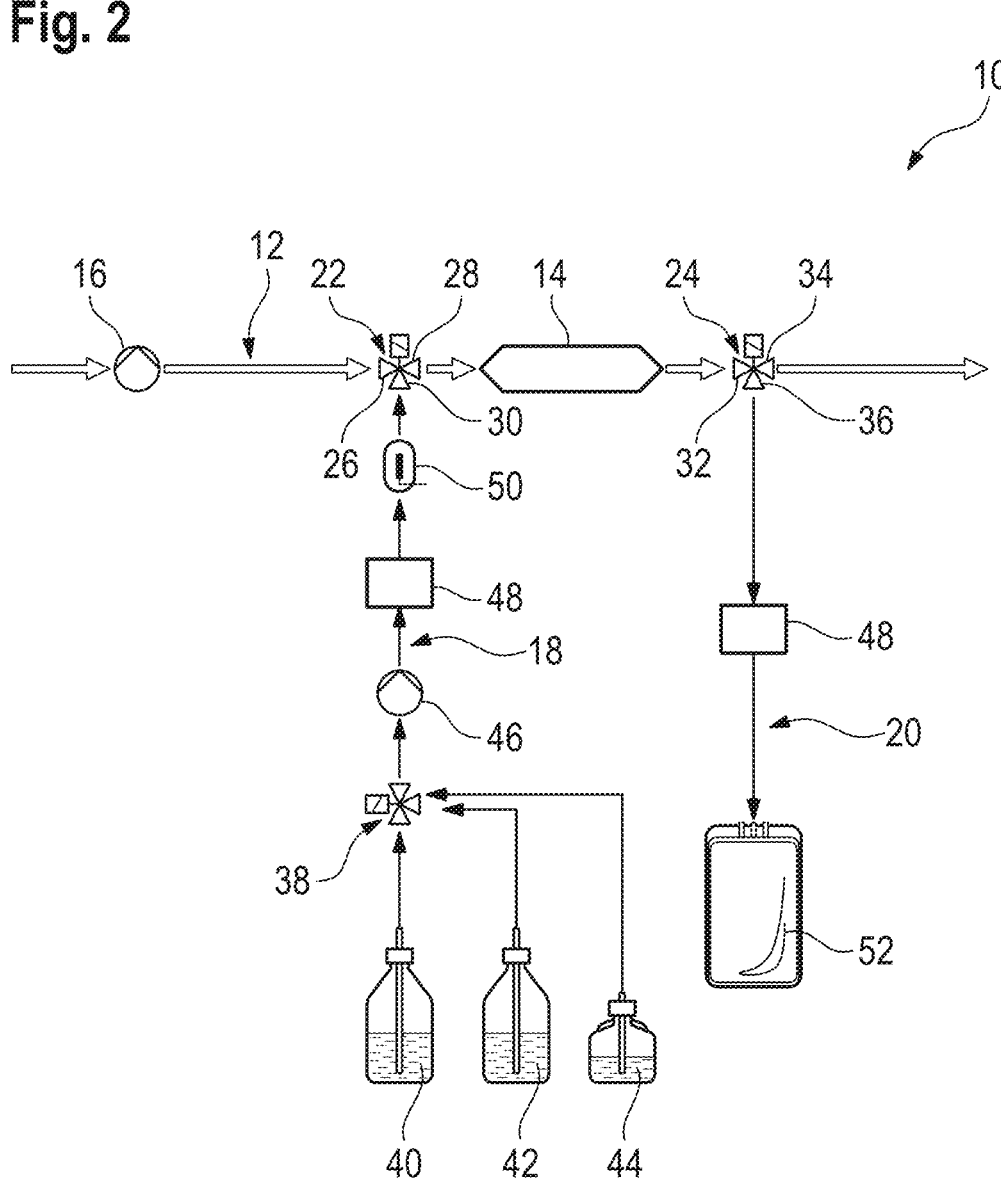
FIG. 2 shows a setup of the device assembly for a first use case.
Figure 3:
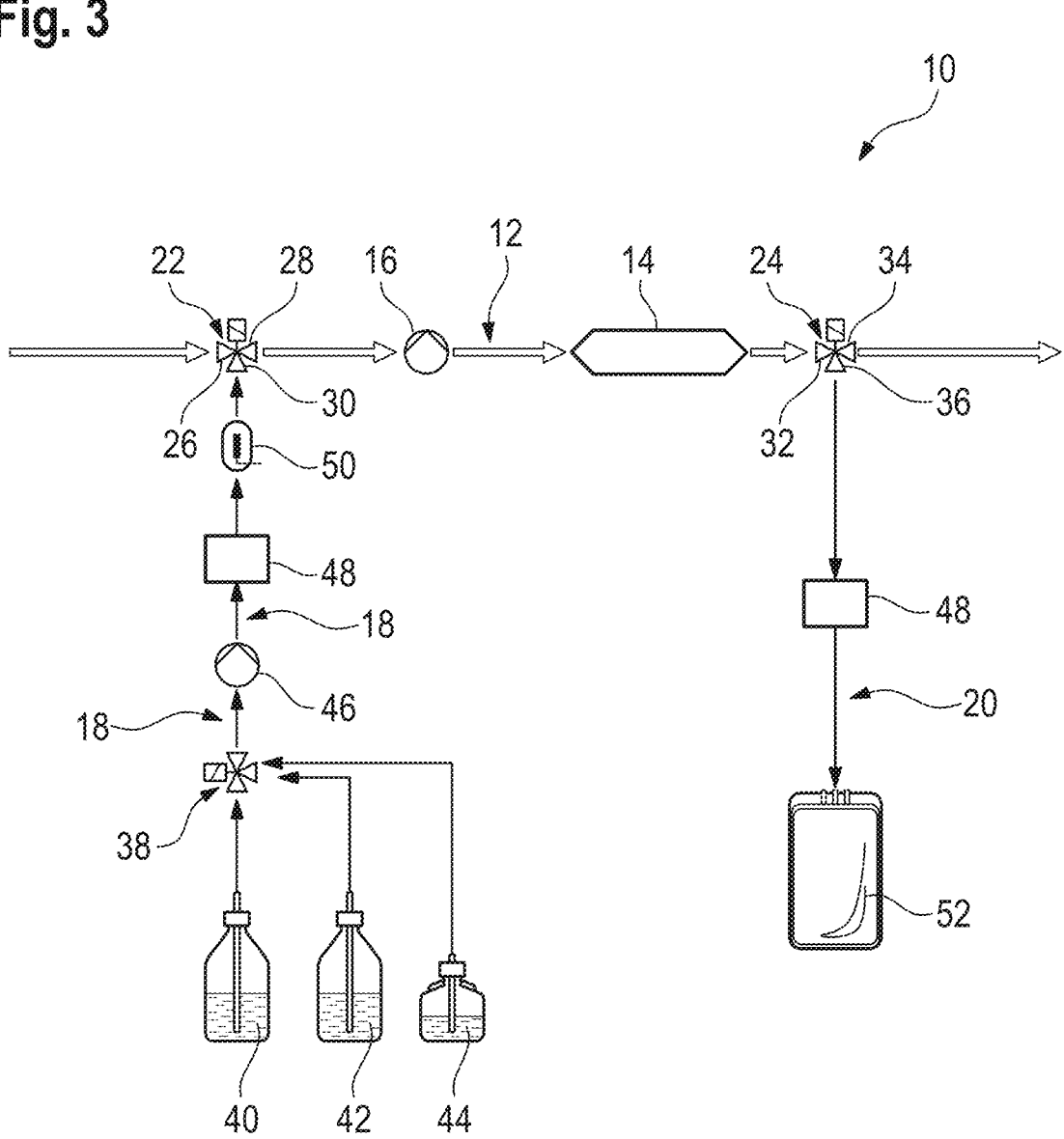
FIG. 3 shows a variant of the setup of FIG. 2.

According to a general first workflow, which can be used for calibration of a pH or conductivity single-use sensor 14, for example, most of the components shown in FIG. 1 are used in a setup as shown in FIG. 2 or FIG. 3. The difference between these two setups is the position of the first switching means 22 relative to the main pump 16. In the setup according to FIG. 2, the main pump 16 is located upstream of the first switching means 22 and thus cannot be used for supplying fluid from the first calibration line 18 to the flow line 12. In the setup according to FIG. 3, the main pump 16 is located downstream of the first switching means 22. In this case, the calibration pump 46 in the first calibration line 18 is optional. The calibration pump 46 can be used if the main pump 16 is shut off during the calibration procedure.

For both setups the general workflow of the calibration procedure is the same. The calibration procedure is started by operating the first switching means 22 such that the flow line inlet 26 is closed and the calibration line inlet 30 and the flow line outlet 28 are opened. Further, the second switching means 24 are operated such that the flow line inlet 32 and the calibration line outlet 36 are opened while the flow line outlet 34 is closed. Thus, the main flow path is interrupted, and a calibration flow path is established. The calibration flow path includes the first calibration line 18, the portion of the flow line 12 leading through the single-use sensor 14, and the second calibration line 20.

The calibration flow path is fed with a caustic, such as 3-molar sodium hydroxide (NaOH), or a suitable buffer solution. The pH or conductivity value measured by the single-use sensor 14 is compared with the corresponding value measured by the reference sensor 48. Based on the result of the comparison, the single-use sensor 14 is calibrated.

The fluid that has passed through the single-use sensor 14 is directed into the second calibration line 20 which ends in a waste container 52.

In case the single-use sensor 14 is to be used after the calibration (if the calibration procedure was conducted before or during the biopharmaceutical process step), the calibration flow path is cleaned with water for injection 44 before the calibration flow path is closed and the flow main flow path is re-established by operating the first and second switching means 22, 24 accordingly.

As shown in FIGS. 2 and 3, the reference sensor 48 can also be arranged in the second calibration line 20. For even more accuracy, one reference sensor 48 can be arranged in the first calibration line 18, and another one in the second calibration line 20.

Furthermore, the caustic or buffer solution can be a traceable reference standard solution 40 with a certified value of the property of interest (pH and/or conductivity etc.).

The same setup can be used for calibration of a single-use sensor 14 measuring (or detecting) other chemical or physical properties like pressure or flow.

The calibration procedure can be combined with a standard deactivation/cleaning/priming step of the biopharmaceutical process.

Another workflow based on a setup with some of the components shown in FIG. 1 will be explained next. This setup does not include a reference sensor, but instead makes use of a reference standard solution 40, preferably a solution which is traceable to a standard or a calibration according to a national or regional organization for standardization as explained before. Such a setup can be used for calibration of sensors 14 measuring, for example, pH, conductivity or concentration of an analyte, such as spectroscopic sensors based on absorption or scattering of radiation.

The main flow path is interrupted, and the calibration flow path is established as explained before. The calibration flow path is then thoroughly flushed with water for injection 44.

After flushing, the reference standard solution 40 is moved through the calibration flow path, and the property of interest is measured by the single-use sensor 14. The result of the measurement is compared with the known value of the reference standard solution 40. Based on the result of the comparison, the single-use sensor 14 is calibrated.

After calibration, the calibration flow path is flushed and/or sanitized. If necessary, the main flow path is re-established by operating the first and second switching means 22, 24 accordingly.

Any fluid that is supplied through the first calibration line 18 is moved either by the calibration pump 46 or by the main pump 16 (in case the main pump 16 is located downstream of the first switching means 22).

Figures 4, 5:
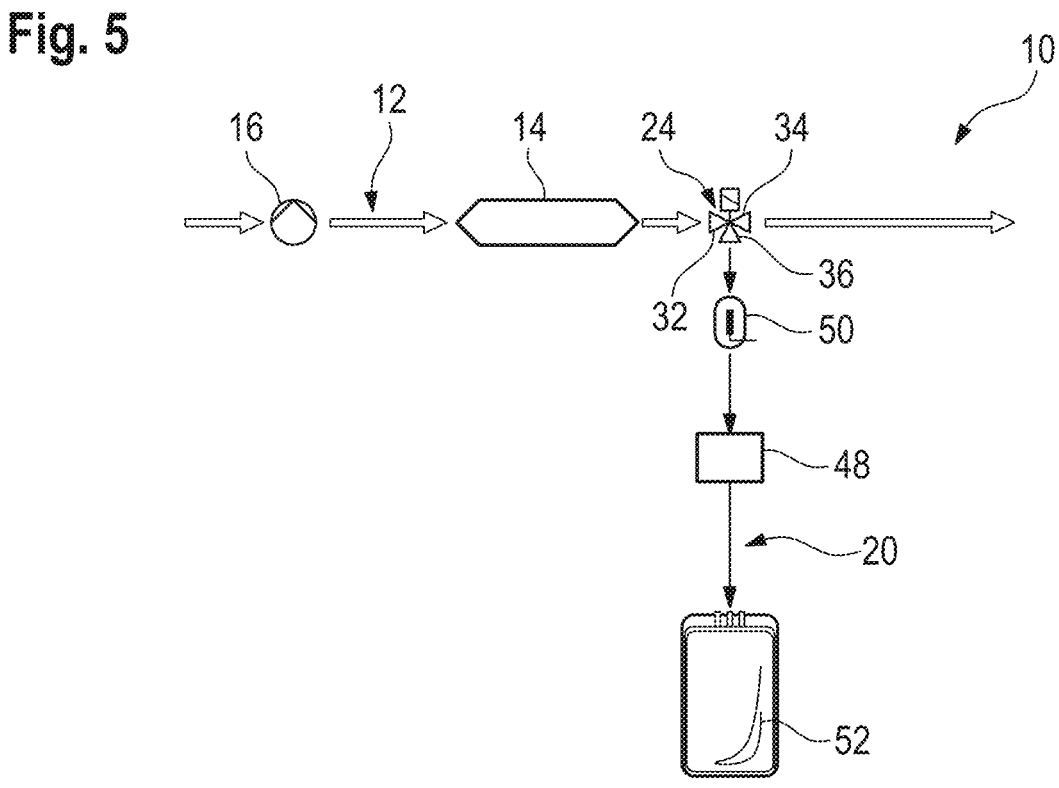
FIG. 4 shows a setup of the device assembly for a second use case.
FIG. 5 shows a setup of the device assembly for a third use case.

For calibration of a single-use pressure sensor 14, the setup shown in FIG. 4 can be used. A calibrated pressure source (calibration pump 46 or a pressure generator) is set to a defined reference pressure when the main flow path is interrupted and the calibration flow path is established. The pressure is measured by the single-use sensor 14 and compared with the defined pressure provided by the calibrated pressure source. Based on the result of the comparison, the single-use sensor 14 is calibrated.

The fluid used in the calibration procedure flows into the second calibration line 20 and is collected in a waste container 52. Alternatively, the fluid can be released into the ambient air. In this case, it may be advisable to use a sterile filter in the second calibration line 20 to prevent contaminations from escaping into the air. (It is assumed that the sterile filter does not influence the static pressure.)

Figure 6:
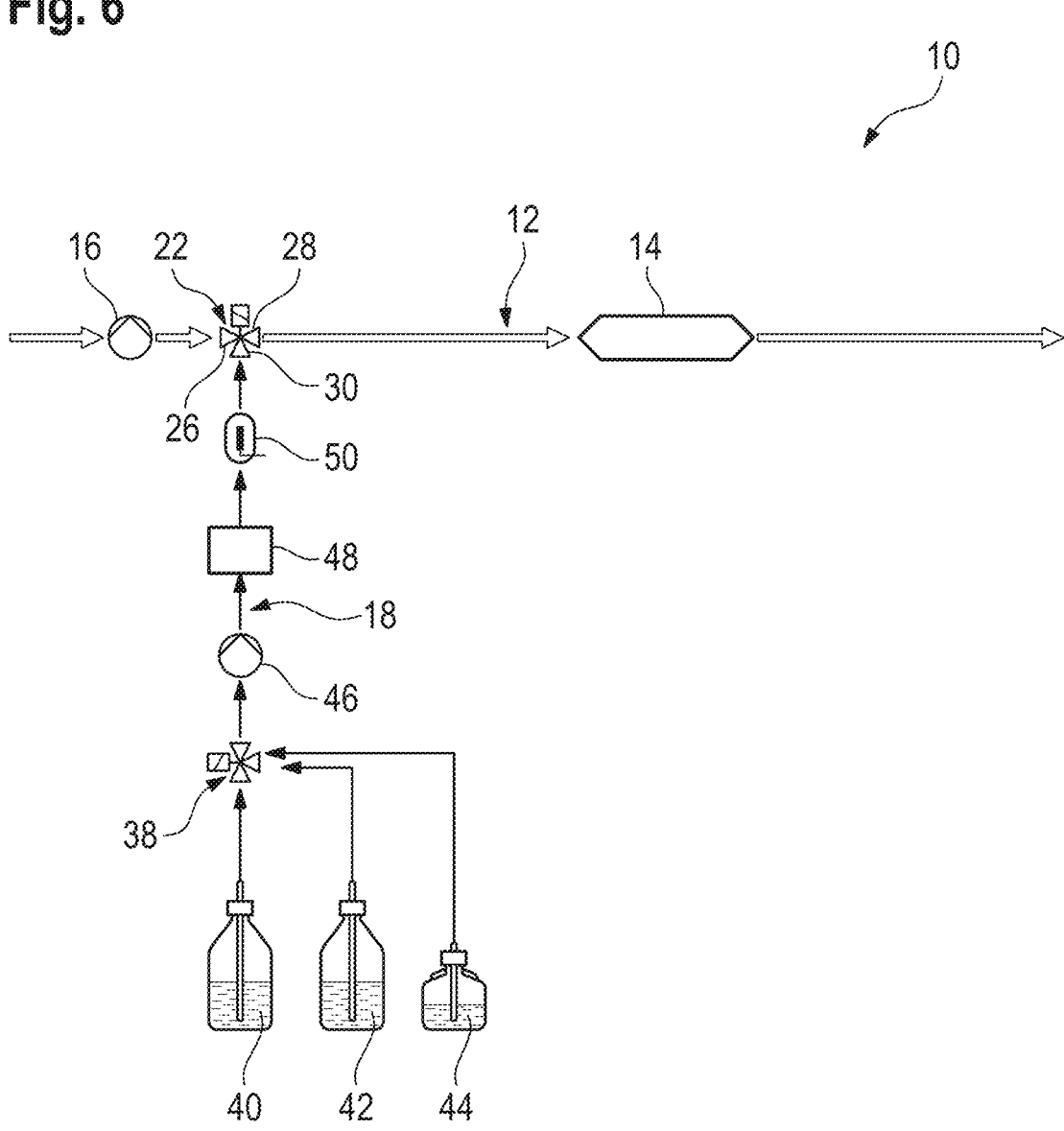
FIG. 6 shows another setup of the device assembly for the third use case.

FIGS. 5 and 6 show different setups for calibrating a single-use flow sensor 14.

In the setup according to FIG. 5, only one calibration line 20 is used (corresponding to the second calibration line 20 shown in FIG. 1). The flow line 12 is flushed with water for injection 44 moved by the main pump 16. For the calibration, the main pump 16 moves a suitable fluid, e.g. a buffer, through the single-use sensor 14. Downstream of the single-use sensor 14 the fluid is redirected into the calibration line 20 via the switching means 24. In the calibration line 20 the flow is measured by the reference sensor 48 and compared to the measured value of the single-use sensor 14. After having passed the reference sensor 48, the fluid is either guided into a waste container 52 or released into the ambient air.

In the setup according to FIG. 6, only the calibration line 18 connected upstream of the single-use sensor 14 to the flow line 12 is used (corresponding to the first calibration line 18 shown in FIG. 1). After flushing the flow line 12, the switching means 22 closes the main flow path downstream of the main pump 16 and connects the calibration line 18 to the flow line 12. The calibration pump 46 is then used to generate a flow with a buffer solution or another suitable fluid. The reference sensor 48 in the calibration line 18 measures the flow, and the comparison of the measurements made by the reference sensor 48 and the single-use sensor 14 is used for calibrating the single-use sensor 14. The fluid that has passed through the single-use sensor 14 further flows through the flow line 12 and is directed to a waste container (not shown here). After calibration (in case of pre-use application) the calibration line 18 is sanitized with a suitable fluid 42, and the switching means 22 re-establishes the main flow path. The flow line 12 is then flushed in a standard way before performing the biopharmaceutical step.

In setups with a calibration line 20 which is selectively connected to the flow line 12 downstream of the single-use sensor 14, the dedicated reference means can also include a reference source (such as a calibrated pressure source/generator) or a reference standard solution 40 as described before. Such reference means may be useful for a reverse-flow calibration, i.e. a calibration procedure in which a fluid flows through the flow line 12 in a direction opposite to the direction of the medium flow during the biopharmaceutical process step.

None of the setups requires a bypass line for bypassing the single-use sensor 14. In particular, the flow of the medium through the main flow line 12 can be interrupted by the first switching means 22 upstream of the single-use sensor 14. At the same time, the first switching means 22 establish a calibration flow path for the calibration procedure, including the first calibration line 18, the portion of the flow line 12 leading through the single-use sensor 14, and—optionally—the second calibration line 20. Alternatively, the medium used for calibrating the single-use sensor 14 is supplied by the main flow line 12.

It is to be noted that the general setup shown in FIG. 1 and the specific setups shown in the other Figures used for the above-explained example use cases are not to be understood in a limiting sense. Certain aspects of the individual setups and workflows may be combined in a suitable manner.

LIST OF REFERENCE SIGNS

10 device assembly
12 flow line
14 single-use sensor
16 main pump
18 (first) calibration line
20 (second) calibration line
22 (first) switching means
24 (second) switching means
26 flow line inlet of first switching means
28 flow line outlet of first switching means
30 calibration line inlet of first switching means
32 flow line inlet of second switching means
34 flow line outlet of second switching means
36 calibration line outlet of second switching means
38 selection means
40 reference standard solution
42 sterilization or sanitation fluid
44 water for injection
46 calibration pump
48 reference sensor
50 sterile filter
52 waste container

The invention claimed is:

1. A device assembly for calibrating a single-use sensor before, during or after a biopharmaceutical manufacturing process step, the device assembly comprising:
   a single-use process equipment assembly for performing at least a part of the process step,
   the single-use process equipment assembly including a flow line through which a medium flows in a defined direction during the process step,
   the single-use process equipment assembly further including an integrated single-use sensor for measuring or detecting a physical or chemical property at a measurement location in the flow line,
   the device assembly comprising at least one calibration line,
   the device assembly comprising at least one switch inserted into the flow line upstream of the measurement location,
   the at least one switch including a flow line inlet, a flow line outlet and a calibration line inlet connected to the calibration line,
   the at least one switch being adapted to selectively switch between:
   a first flow path, in which the flow line inlet and the flow line outlet are opened while the calibration line inlet is closed, and
   a second flow path, in which the flow line inlet is closed while the calibration line inlet and the flow line outlet are opened,
   the device assembly comprising a dedicated reference element provided in the calibration line,
   the dedicated reference element including a reference sensor or a reference source or a reference standard solution related to the physical or chemical property to be measured or detected by the single-use sensor.

2. The device assembly according to claim 1, wherein the at least one switch is arranged upstream of a main pump of the process equipment assembly.

3. The device assembly according to claim 1, wherein a calibration pump is arranged in the calibration line.

4. The device assembly according to claim 1, wherein a sterile filter is arranged in the calibration line.

5. The device assembly according to claim 1, wherein the dedicated reference element is traceable to a standard or a calibration according to a national or regional organization for standardization.

6. The device assembly according to claim 1, wherein an upstream calibration line is connected to the calibration line inlet of an upstream switch inserted into the flow line upstream of the measurement location, and a downstream calibration line is connected to the calibration line outlet of a downstream switch inserted into the flow line downstream of the measurement location.

7. The device assembly according to claim 1, wherein the calibration line is connected to at least one reservoir or feed line of the reference standard solution; a sanitizing solution; a sterilization solution; or a flushing fluid.

8. The device assembly according to claim 7, further comprising a selector adapted to connect only one reservoir or feed line to the calibration line at a time.

9. The device assembly according to claim 1, wherein the at least one switch is operated automatically by a control unit.

10. A method of for calibrating the single-use sensor before, during or after the biopharmaceutical manufacturing process step, the method being performed with the device assembly according to claim 1 and comprising the steps of:

operating the at least one switch such that a calibration flow path is established, in which the flow line inlet is closed while the calibration line inlet and the flow line outlet are opened;

measuring the physical or chemical property by the single-use sensor; and using the measurement and the reference element to calibrate the single-use sensor.

11. The method according to claim 10, further comprising the step of providing a dedicated reference standard solution, which is related to the physical or chemical property to be measured or detected by the single-use sensor and traceable to a standard or a calibration according to a national or regional organization for standardization, in the calibration line of the device assembly.

12. The method according to claim 11, wherein the reference standard solution is used for calibrating a sensor of the following: a sensor measuring pH; a sensor measuring electrical conductivity; a sensor measuring concentration of an analyte; a spectroscopic sensor based on absorption or scattering of radiation.

13. A device assembly for calibrating a single-use sensor before or after a biopharmaceutical manufacturing process step, the device assembly comprising:

a single-use process equipment assembly for performing at least a part of the process step, the single-use process equipment assembly including a flow line through which a medium flows in a defined direction during the process step, the single-use process equipment assembly further including an integrated single-use sensor for measuring or detecting a physical or chemical property at a measurement location in the flow line, the device assembly comprising at least one calibration line, the device assembly comprising at least one switch inserted into the flow line downstream of the measurement location, the at least one switch including a flow line inlet, a flow line outlet and a calibration line outlet connected to the calibration line, the at least one switch being adapted to selectively switch between:

a first flow path, in which the flow line inlet and the flow line outlet are opened while the calibration line outlet is closed, and a second flow path, in which the flow line inlet and the calibration line outlet are opened while the flow line outlet is closed, the device assembly comprising a dedicated reference element provided in the calibration line, the dedicated reference element including a reference sensor or a reference source or a reference standard solution related to the physical or chemical property to be measured or detected by the single-use sensor.

14. The device assembly according to claim 13, wherein the calibration line has an open end.

15. The device assembly according to claim 13, wherein the calibration line leads into a waste container.

\* \* \* \* \*